United States Patent
Asai et al.

(10) Patent No.: US 11,991,038 B2
(45) Date of Patent: May 21, 2024

(54) DAMAGED PART IDENTIFYING APPARATUS, METHOD AND PROGRAM

(71) Applicant: NIPPON TELEGRAPH AND TELEPHONE CORPORATION, Tokyo (JP)

(72) Inventors: Fumika Asai, Musashino (JP); Shunsuke Kanai, Musashino (JP); Satoshi Suzuki, Musashino (JP); Haruhisa Nozue, Musashino (JP); Kazuaki Akashi, Musashino (JP); Naomi Murata, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 57 days.

(21) Appl. No.: 17/801,591

(22) PCT Filed: Feb. 26, 2020

(86) PCT No.: PCT/JP2020/007848
§ 371 (c)(1),
(2) Date: Aug. 23, 2022

(87) PCT Pub. No.: WO2021/171441
PCT Pub. Date: Sep. 2, 2021

(65) Prior Publication Data
US 2023/0128841 A1    Apr. 27, 2023

(51) Int. Cl.
*H04B 3/46* (2015.01)
*H04L 41/0677* (2022.01)

(52) U.S. Cl.
CPC .................. *H04L 41/0677* (2013.01)

(58) Field of Classification Search
CPC .............................. H04L 41/0677; H04B 3/46
(Continued)

(56) References Cited

U.S. PATENT DOCUMENTS

| | | | | |
|---|---|---|---|---|
| 2014/0038523 | A1* | 2/2014 | McGeer | H04L 41/0677 455/41.2 |
| 2018/0019912 | A1* | 1/2018 | Ichimura | H04L 41/0677 |

FOREIGN PATENT DOCUMENTS

| | | |
|---|---|---|
| JP | 4087974 B2 * | 5/2008 |
| KR | 20190135923 A * | 12/2019 |

OTHER PUBLICATIONS

Kimihiko Fukami et al., Study on Method of Identifying affected equipment to support recovery operation in a large-scale disaster, IEICE Technical Report, vol. 119, No. 358, 2020, pp. 19-24.

* cited by examiner

*Primary Examiner* — Helene E Tayong
(74) *Attorney, Agent, or Firm* — Harness, Dickey & Pierce, P.L.C.

(57) ABSTRACT

In a failure location identification apparatus according to one embodiment, a facility information management unit records therein facility information including positional information of a physical resource, an external factor information management unit records therein external factor information concerning an external factor that possibly becomes a factor that causes a failure in the physical resource, the external factor information including positional information of the external factor, and a facility influence definition management unit records therein information concerning a possible influence of the external factor on the physical resource. A facility influence determination process unit identifies a failure occurrence location at which the failure is estimated to occur in the physical resource, from the facility information that is recorded in the facility information management unit and has positional information corresponding to the positional information of the external factor information, and outputs failure location information including information indicating the identified (Continued)

failure occurrence location, when it is determined that the external factor information recorded in the external factor information management unit influences the physical resource, on a basis of the information recorded in the facility influence definition management unit.

13 Claims, 23 Drawing Sheets

(58) Field of Classification Search
USPC .......................................................... 375/224
See application file for complete search history.

Fig. 2

| ITEM NUMBER | EVENT | LAYER 1 | LAYER 2 | LAYER 3 | LAYER 4 | LAYER 5 | LAYER 6 | ... |
|---|---|---|---|---|---|---|---|---|
| 1 | EVENT 1 | A | ○ | UNDERGROUND | a |  | ○ | ... |
| 2 | EVENT 2 | A |  |  | b | ○ |  | ... |
| 3 | EVENT 1 | B |  | UNDERGROUND | c |  |  | ... |
| 4 | EVENT 3 | C |  |  | d | ○ | ○ | ... |
| 5 | EVENT 2 | B |  | ABOVEGROUND | b | ○ |  | ... |
| 6 | EVENT 3 | C | ○ |  | a | ○ |  | ... |
| ⋮ | ⋮ | ⋮ | ⋮ | ⋮ | ⋮ | ⋮ | ⋮ | ⋮ |

Fig. 4

| EVENT | EVENT OCCURRENCE DETECTION DEFINITION |
|---|---|
| EVENT 1 | LAYER 3 = "UNDERGROUND" |
| EVENT 2 | LAYER 4 = "b" + LAYER 5 = "O" |
| EVENT 3 | LAYER 1 = "C" + LAYER 5 = "O" |
| ⋮ | ⋮ |

Fig. 6

| EVENT | CONTRIBUTION RATE (= FAILURE OCCURRENCE LOCATION / EVENT OCCURRENCE LOCATION) |
|---|---|
| EVENT n (WIRE BREAKING DUE TO DEBRIS FLOW) | 33(=1/3) |
| EVENT m (WIRE BREAKING DUE TO LANDSLIDE) | 100(2/2) |
| ⋮ | ⋮ |

Fig. 10

| PHYSICAL RESOURCE | POSITIONAL INFORMATION (LATITUDE / LONGITUDE) |
|---|---|
| BUILDING A | ○○°,○○',○○"/×××°,××',××" |
| MAINTENANCE HOLE a | ○○°,○○',○□"/×××°,××',△△" |
| ⋮ | ... |

Fig. 12

| LAYER | INFORMATION |
|---|---|
| LAYER 1 | TERRAIN INFORMATION |
| LAYER 2 | CONSTRUCTION WORK INFORMATION |
| LAYER 3 | DISASTER INFORMATION (RIVER FLOODING) |

Fig. 13

| EVENT | EVENT OCCURRENCE DETECTION DEFINITION | CONTRIBUTION RATE |
|---|---|---|
| CABLE BREAKING DUE TO RIVER FLOODING | CASE WHERE RIVER FLOODING LOCATION AND TERRAIN INFORMATION = "BRIDGE" COINCIDE WITH EACH OTHER | 10 |
| CABLE BREAKING DUE TO EXCAVATION WORK | CASE WHERE EXCAVATION EXISTS IN CONSTRUCTION WORK INFORMATION LAYER | 5 |
| ⋮ | ⋮ | ⋮ |

Fig. 15

| POSITION | OCCURRING EVENT |
|----------|-----------------|
| P1 | |
| P2 | CABLE BREAKING DUE TO RIVER FLOODING |
| P3 | |
| P4 | CABLE BREAKING DUE TO EXCAVATION WORK |

The possibility of the failure occurrence location in the specified range is as follows.

Cable CA3: Cable breaking due to river flooding, 10
Cable CA2: Cable breaking due to excavation work, 5
Cable CA4: Unknown, 0
Maintenance hole MH2: Unknown, 0
Maintenance hole MH3: Unknown, 0
Maintenance hole MH4: Unknown, 0

DAMAGED PART IDENTIFYING APPARATUS, METHOD AND PROGRAM

CROSS-REFERENCE TO RELATED APPLICATIONS

This application is a 371 U.S. National Phase of International Application No. PCT/JP2020/007848, filed on Feb. 26, 2020. The entire disclosure of the above application is incorporated herein by reference.

TECHNICAL FIELD

An embodiment of the present invention relates to a failure location identification apparatus, method, and program.

BACKGROUND ART

In communication facilities such as cables and civil engineering communication structures that are laid outdoors, failures due to external factors such as construction works and natural disasters are likely to occur. However, compared with network apparatuses, there are fewer locations at which sensing or alarm monitoring is carried out, and hence on-site investigations are necessary to identify a detailed failure zone and a cause, resulting in a long operation for understanding of the situation.

In view of this, for example, Non-Patent Literature 1 proposes a technique of: modeling respective constituent elements of a physical layer and a logical layer of a network, by means of uniform objects; identifying a physical layer object that is redundantly utilized by the logical layer; and thus estimating a physical resource that causes a failure on the logical layer.

CITATION LIST

Non-Patent Literature

Non-Patent Literature 1: Kimihiko Fukami, Masataka Sato, Shohei Nishikawa, Kenji Murase, Kenichi Tayama, "Study on Method of Identifying Affected Equipment to Support Recovery Operation in a Large-scale Disaster," IEICE technical report ICM2019-33, LOIS2019-48 (2020 January)

SUMMARY OF THE INVENTION

Technical Problem

According to the technique proposed in Non-Patent Literature 1, a physical resource having many failure paths of a logical layer is likely to be determined as a candidate of a suspicious facility. In contrast, if a cable zone is long and if there are few monitoring locations, it is difficult in some cases to identify a detailed place from an estimated zone.

This invention has been made in view of the above-mentioned circumstances, and has an object to improve the identification accuracy of a detailed place of a failure location at the time of failure occurrence.

Means for Solving the Problem

In order to achieve the above-mentioned object, a failure location identification apparatus according to an aspect of this invention is a failure location identification apparatus that identifies a failure occurrence location of a physical resource, including: a facility information management unit that records therein facility information including positional information of the physical resource; an external factor information management unit that records therein external factor information concerning an external factor that possibly becomes a factor that causes a failure in the physical resource, the external factor information including positional information of the external factor; a facility influence definition management unit that records therein information concerning a possible influence of the external factor on the physical resource; and a facility influence determination process unit that identifies the failure occurrence location at which the failure is estimated to occur in the physical resource, from the facility information that is recorded in the facility information management unit and has positional information corresponding to the positional information of the external factor information, and outputs failure location information including information indicating the identified failure occurrence location, when it is determined that the external factor information recorded in the external factor information management unit influences the physical resource, on a basis of the information recorded in the facility influence definition management unit.

Effect of the Invention

According to an aspect of this invention, a failure occurrence location at which a failure is estimated to occur in a resource is identified on the basis of information concerning a possible influence of an external factor on the physical resource, whereby the identification accuracy of a detailed place of the failure occurrence location can be improved at the time of the failure occurrence.

BRIEF DESCRIPTION OF DRAWINGS

FIG. 2 is a diagram illustrating an example of past failure information in the form of a table.

FIG. 4 is a diagram illustrating an example of the event occurrence detection definition in the form of a table.

FIG. 6 is a diagram illustrating an example of the contribution rate corresponding to FIG. 5A and FIG. 5B in the form of a table.

FIG. 10 is a diagram illustrating an example of the facility information in the form of a table.

FIG. 12 is a diagram illustrating an example of the external factor layer in the form of a table.

FIG. 13 is a diagram illustrating an example of the event occurrence detection definition and the contribution rate in the form of a table.

FIG. 15 is a diagram illustrating an example of events that are estimated to occur in the occurrence situation example of the external factor in FIG. 14 and the event occurrence detection definition example in FIG. 13, in the form of a table.

DESCRIPTION OF EMBODIMENTS

Hereinafter, one embodiment according to this invention is described with reference to the drawings.

(Configuration)

Figure 1A:
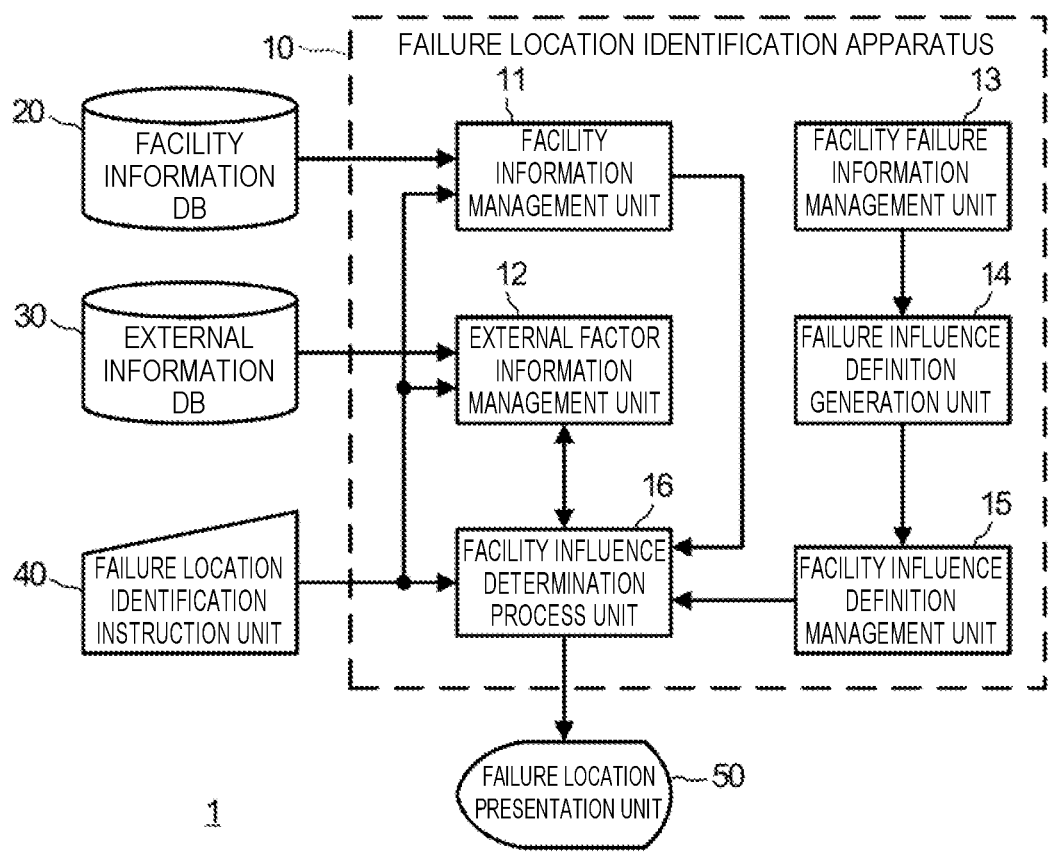
FIG. 1A is a block diagram illustrating an example of a schematic configuration of a failure location identification system including a failure location identification apparatus according to one embodiment of the present invention.

FIG. 1A is a block diagram illustrating an example of a schematic configuration of a failure location identification system 1 including a failure location identification apparatus 10 according to one embodiment of the present invention. In the example illustrated in FIG. 1A, the failure location identification system 1 includes the failure location identification apparatus 10, a facility information database (in the drawings, the database is abbreviated as DB) 20, an external information database 30, a failure location identification instruction unit 40, and a failure location presentation unit 50. The failure location identification apparatus 10 can be configured as a computer, and includes a facility information management unit 11, an external factor information management unit 12, a facility failure information management unit 13, a failure influence definition generation unit 14, a facility influence definition management unit 15, and a facility influence determination process unit 16, as functions necessary to implement this embodiment.

Figure 1B:
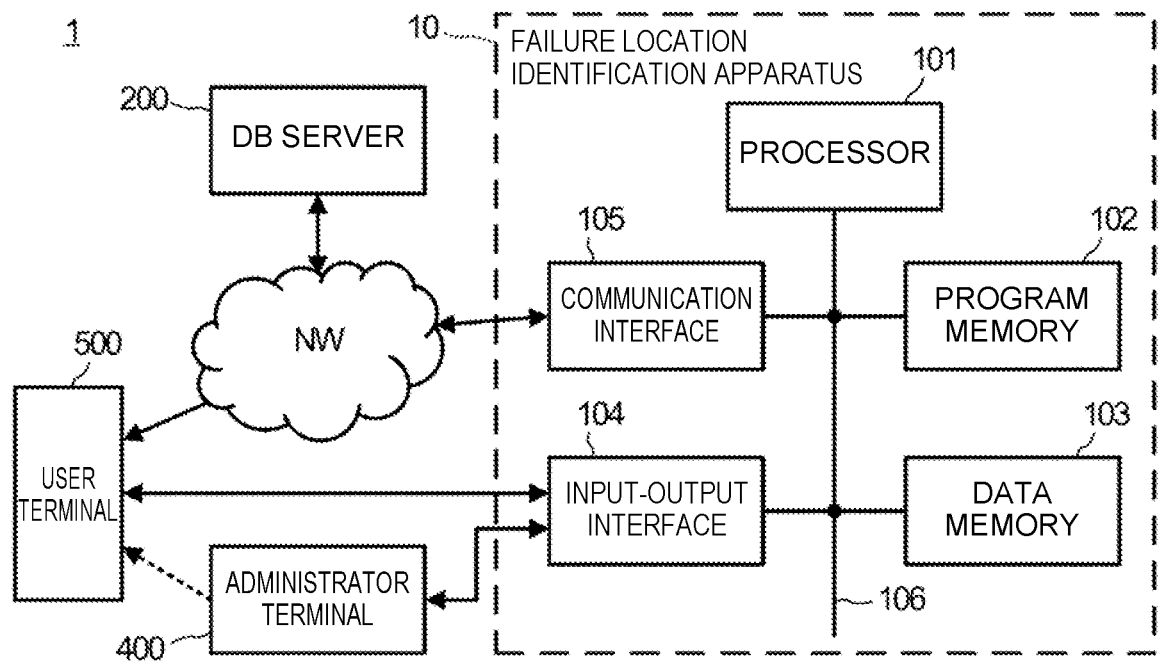
FIG. 1B is a diagram illustrating an example of a hardware configuration of the failure location identification system.

FIG. 1B is a diagram illustrating an example of a hardware configuration of the failure location identification system 1. In the example illustrated in FIG. 1B, the failure location identification apparatus 10 is configured by, for example, a server computer or a personal computer, and includes a hardware processor 101 such as a CPU. Then, a program memory 102, a data memory 103, an input-output interface 104, and a communication interface 105 are connected to the processor 101 via a bus 106.

The communication interface 105 includes, for example, one or more wired or wireless communication interface units, and enables transmission and reception of information with respect to external devices such as a database server 200 and a user terminal 500, via a communication network NW. For example, an interface to which a low-power wireless data communication standard such as a wireless LAN is adopted is used as the wireless interface. The database server 200 can include the facility information database 20 and the external information database 30. The user terminal 500 is, for example, a terminal for an on-site worker who performs recovery operations of a failure location. An information terminal that is communicable via the communication network NW may be used as the user terminal 500. The communication network NW can include the Internet, public networks, and LANs or the like.

An administrator terminal 400 that is attached to the failure location identification apparatus 10 and is operated by an administrator is connected to the input-output interface 104. The administrator terminal 400 includes an input device and an output device. The input device includes a keyboard, a touch panel, a touchpad, and a mouse or the like. The output device includes a display device for which liquid crystal, organic EL, or the like is used. The input-output interface 104 is used to perform: a process of importing operation data that is input by the administrator through the input device; and a process of outputting and displaying output data to the output device. A device built in the failure location identification apparatus 10 may be used as the administrator terminal 400, and an input device and an output device of another information terminal communicable via the communication network NW may be used as the administrator terminal 400. In the case where the user terminal 500 is the information terminal communicable via the communication network NW, information may be transmitted from the administrator terminal 400 to the user terminal 500 via the communication network NW, as indicated by a broken line in FIG. 1B.

For the program memory 102, for example, a non-volatile memory that is writable and readable as needed, such as an HDD or an SSD (Solid State Drive) and a non-volatile memory such as a ROM are used in combination as a non-temporary tangible storage medium. The program memory 102 stores therein programs necessary to execute various control processes according to one embodiment.

For the data memory 103, for example, the above-mentioned non-volatile memories and a volatile memory such as a RAM are used in combination as a tangible storage medium. The data memory 103 is used to store various pieces of data that are acquired and created in the course of performing an information collection process.

The failure location identification apparatus 10 according to one embodiment of the present invention can be configured as a data processing apparatus including, as processing function units based on software, the facility information management unit 11, the external factor information management unit 12, the facility failure information management unit 13, the failure influence definition generation unit 14, the facility influence definition management unit 15, and the facility influence determination process unit 16 illustrated in FIG. 1A. The processing function unit of each of the facility information management unit 11, the external factor information management unit 12, the facility failure information management unit 13, the failure influence definition management unit 14, the facility influence definition management unit 15, and the facility influence determination process unit 16 can be realized by reading and executing, by the processor 101, the program stored in the program memory 102. Note that, part or all of these processing function units may be realized in other various forms including an integrated circuit such as ASIC (Application Specific Integrated Circuit) or FPGA (Field-Programmable Gate Array).

The failure location identification instruction unit 40 illustrated in FIG. 1A is, for example, the administrator terminal 400, and may be the user terminal 500. Moreover, the failure location presentation unit 50 is, for example, the user terminal 500, and may be the administrator terminal 400.

The facility information database 20 and the external information database 30 illustrated in FIG. 1A are configured in the database server 200, but may be configured using the data memory 103. The facility information database 20 and the external information database 30 may be provided in an external storage medium such as a USB (Universal Serial Bus) memory, and may be connected to the failure location identification apparatus 10 as needed.

Here, the facility information database 20 is a database that accumulates therein positional information (map information) of a physical resource. The physical resource is an apparatus or the like concerning service providing in a facility that is managed and monitored by a service provider to maintain its service. For example, if the service provided by the service provider is a communication network service, the physical resource is a facility that accommodates the network. This includes a communication apparatus, a building (station building) that accommodates the communication apparatus, a maintenance hole, a cable formed by bundling core wires, a pipeline or a cable tunnel that accommodates the cable, and the like. The positional information may be represented using the longitude and latitude of each physical resource, and may be managed using an X-Y coordinate whose origin is at any reference position. It is desirable that the positional information accumulated in the facility information database 20 can be regularly updated, and further, the positional information is updated when any change is made to the physical resource.

Moreover, the external information database 30 is a database that accumulates therein external factor information that possibly causes a failure in the physical resource. The external factor information includes terrain information of rivers, bridges, and the like, construction work information of excavation works and the like, disaster information, and the like, and further includes positional information (map information) of these items. The disaster information concerns, for example, river flooding, submergence, bridge collapse, landslides, road collapse, ground sinking, and the like. It is desirable that the external factor information accumulated in the external information database 30 can also be regularly updated, and further, the external factor information is updated when any change is made to the information. In the case of adopting the regular update, the interval of the regular update in the external information database 30 is significantly shorter than that in the facility information database 20. Moreover, the update interval may be different in accordance with the type of the external factor information. For example, the update interval may be on a daily or weekly basis for the terrain information, may be on an hourly basis for the construction work information, and may be on a minutely basis for the disaster information. Further, the update interval may be adjusted on the basis of weather information and the like, for the disaster information.

Note that, in FIG. 1A, the external information database 30 is illustrated as one database, but may be distributed into a plurality of databases. These distributed databases may be respectively managed and operated by different administrators. That is, part or all of the external information database 30 may be configured by utilizing a database provided by an external provider.

The facility information management unit 11 acquires, from the facility information database 20, the positional information (map information) of the physical resource in a management area managed by the failure location identification apparatus 10, and manages the acquired positional information. This acquisition of the positional information can be performed in response to, for example, an instruction from the outside by an administrator or the like, when the physical resource in the management area is changed.

The external factor information management unit 12 acquires the external factor information concerning the management area of the failure location identification apparatus 10, from the external information database 30. This acquisition of the external factor information can be performed in response to, for example, an instruction to identify a failure location, from the outside by an administrator operating the failure location identification instruction unit 40 or the like.

The facility failure information management unit 13 manages failure information concerning a failure that has occurred in the past. FIG. 2 is a diagram illustrating an example of the past failure information managed by the facility failure information management unit 13, in the form of a table. As illustrated in FIG. 2, the facility failure information management unit 13 records the situation of an external factor corresponding to the position at which an event has occurred, in association with the event. Herein, the event represents the occurrence factor of the failure that has occurred, such as wire breaking due to flooding of a river. That is, the facility failure information management unit 13 records the physical resource and the external factor information that possibly causes the failure in association with each other on the same positional coordinates. Note that, each layer in FIG. 2 is an external factor layer that is defined for each external factor information by the external factor information management unit 12, and the layer is used to manage, by the facility influence determination process unit 16, the external factor information acquired by the external factor information management unit 12 on the basis of the positional information thereof.

The failure influence definition generation unit 14 generates a detection definition of an event occurrence due to the external factor information and a contribution rate of the failure given to the physical resource. The detection definition of the event occurrence indicates in which combination of external factors the event occurs, and the contribution rate indicates the possibility at which the combination of external factors in the detection definition of the event occurrence influences the physical resource. The failure influence definition generation unit 14 performs, for example, statistic calculations and modifications from: the failure information that has occurred in the past and is managed by the facility failure information management unit 13; the positional information of the physical resource in the facility information management unit 11; and the information of each external factor layer managed by the external factor information management unit 12, to thereby enable generating the detection definition of the event occurrence and the contribution rate. As a matter of course, the detection definition of the event occurrence and the contribution rate may be generated according to other methods than this method. Then, the failure influence definition generation unit 14 sets the generated detection definition of the event occurrence and the generated contribution rate to the facility influence definition management unit 15.

The facility influence definition management unit 15 manages the event occurrence detection definition due to the external factor information and the contribution rate of the failure given to the physical resource that are set by the failure influence definition generation unit 14.

Figure 3:
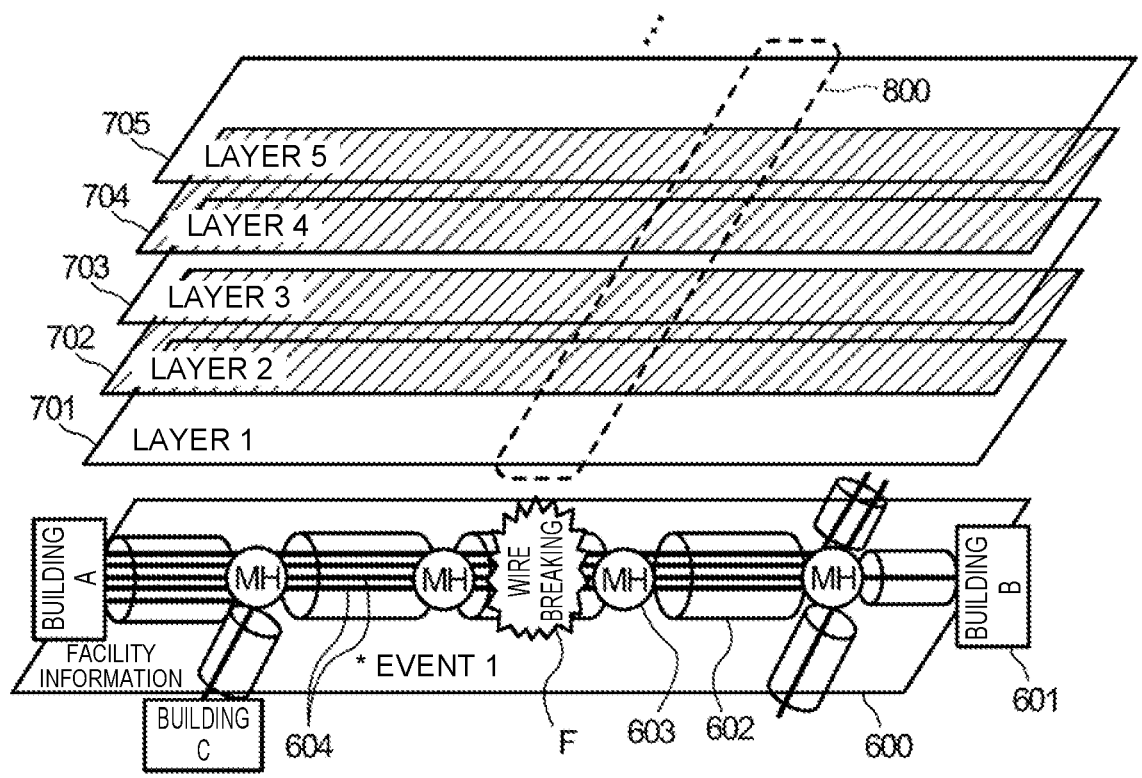
FIG. 3 is a schematic diagram for describing automatic setting of event occurrence detection definition due to an external factor.

FIG. 3 is a schematic diagram for describing automatic setting of the event occurrence detection definition due to the external factor in the failure influence definition generation unit 14. In FIG. 3, facility information 600 is the positional information (map information) of the physical resource managed by the facility information management unit 11. In this example, pipelines 602 and maintenance holes (in the drawing, abbreviated as MHs) 603 are laid between two buildings 601 (a building A and a building B), and cables 604 that connect communication apparatuses (not illustrated) respectively accommodated in the buildings 601 are accommodated in the pipelines 602 and the maintenance holes 603. A plurality of external factor layers 701, 702, 703, 704, 705, . . . corresponding to the facility information 600 are defined and managed by the external factor information management unit 12. Note that, in FIG. 3, the even-numbered external factor layers are illustrated by hatching in order to facilitate discrimination of each external factor layer (that is, the hatching is not used to represent a cross-section). Here, if a failure F occurs at a position illustrated on the facility information 600 in FIG. 3, a position corresponding to the occurrence position of the failure F, which is illustrated by surrounding with a broken line on the external factor layers 701, 702, 703, 704, 705, . . . , is an event occurrence location 800. Then, an external factor information group existing at the event occurrence location 800 is recorded as one of the past failure information as illustrated in FIG. 2, with an event ID being given to the external factor information group. The same event ID is given to the same failure. For example, in the example of FIG. 2, two events of item numbers 1 and 3 are recorded as an event 1. The failure influence definition generation unit 14 acquires relevant external factor layers from information of the same event, and generates the most correlative and closest condition among the combinations of the acquired external factor layers, as the event occurrence detection definition.

FIG. 4 is a diagram illustrating an example of the event occurrence detection definition automatically set by the failure influence definition generation unit 14, in the form of a table. With regard to the example of FIG. 2, for example, the event occurrence detection definition that the external factor information on the layer 3 (external factor layer 703) is an "underground" is generated for the event 1, and the generated detection definition is set to the facility influence definition management unit 15.

Figure 5A:
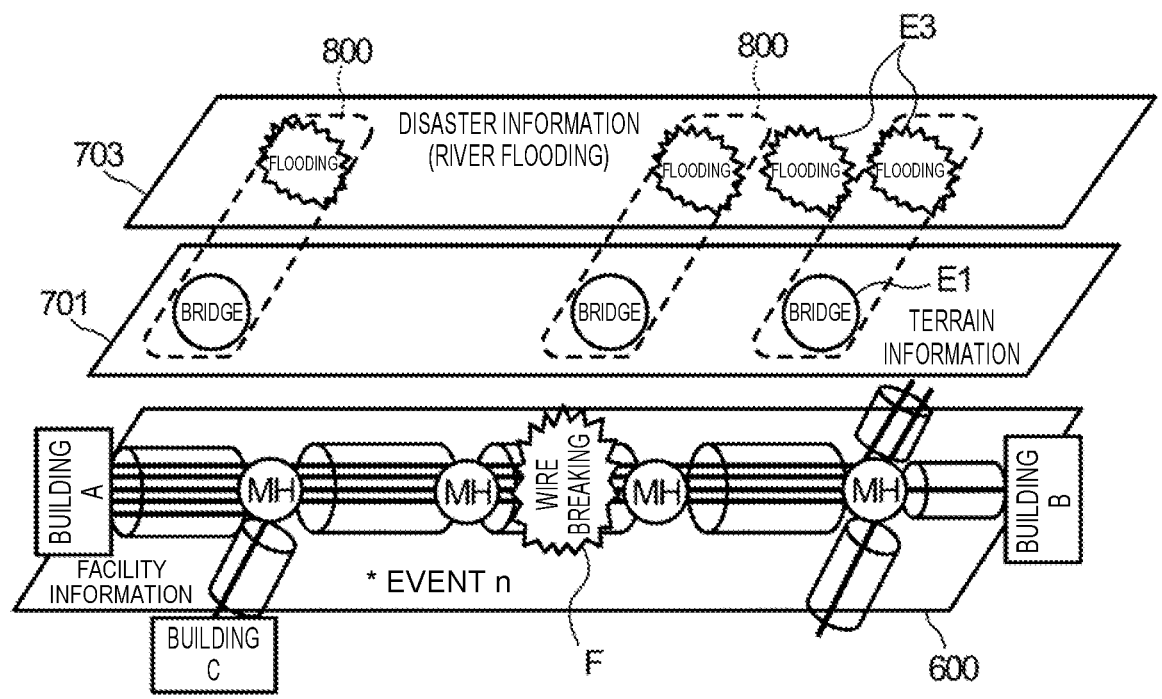
FIG. 5A is a schematic diagram for describing automatic setting of a contribution rate of a failure to a physical resource, based on the past failure information.
Figure 5B:
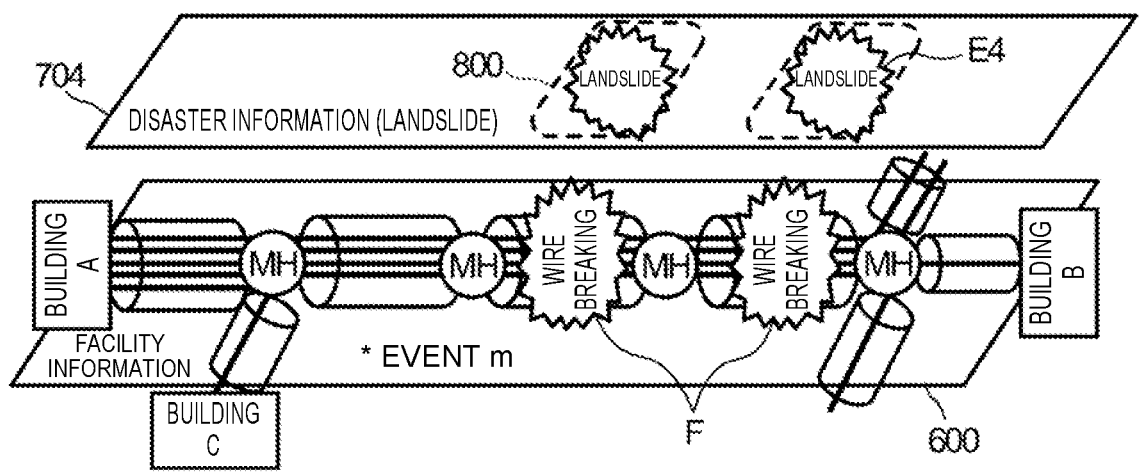
FIG. 5B is a schematic diagram for describing the automatic setting of the contribution rate of the failure to the physical resource, based on the past failure information.

FIG. 5A and FIG. 5B are schematic diagrams for describing automatic setting of the contribution rate of the failure given to the physical resource, based on the past failure information in the failure influence definition generation unit 14. For example, it is assumed that a failure F due to an event n occurs at a position at which: an external factor E1 (bridge) existed in the past in the terrain information of the external factor layer 701; and an external factor E3 (flooding of a river) existed in the past in the disaster information of the external factor layer 703. In this case, in the example of FIG. 5A, in addition to the event occurrence location 800 corresponding to the position at which the failure F actually occurred, there are two positions having the same external factor group as that of this position. The failure influence definition generation unit 14 defines the two positions at which the failure F does not actually occur, as the event occurrence locations 800. Moreover, it is assumed that a failure F due to an event m occurs at a position at which an external factor E4 (landslide) existed in the past in the disaster information of the external factor layer 704. In this case, in the example of FIG. 5B, the number of the event occurrence locations 800 corresponding to the position at which the failure F actually occurred is two. The failure influence definition generation unit 14 calculates the contribution rate as, for example, "the contribution rate=the number of failure occurrence locations/the number of event occurrence locations" from such past failure information. FIG. 6 is a diagram illustrating an example of the contribution rate that is automatically set by the failure influence definition generation unit 14 and corresponds to the examples of FIG. 5A and FIG. 5B, in the form of a table. In the example of FIG. 5A, because the number of failure occurrence locations is one and the number of event occurrence locations is three, the contribution rate is "1/3=33." Moreover, in the example of FIG. 5B, because the number of failure occurrence locations is two and the number of event occurrence locations is also two, the contribution rate is "2/2=100." The contribution rates calculated in this way are set to the facility influence definition management unit 15.

At the time of failure occurrence in the physical resource, in response to an instruction to identify the failure location, from the outside by the administrator operating the failure location identification instruction unit 40 or the like, the facility influence determination process unit 16 estimates the failure occurrence location and the factor thereof on the basis of: the facility information managed by the facility information management unit 11; the external factor information acquired by the external factor information management unit 12; and the event occurrence detection definition and the contribution rate managed by the facility influence definition management unit 15. The facility influence determination process unit 16 presents the estimated result by means of the failure location presentation unit 50.

Note that, although the past failure information managed by the facility failure information management unit 13 may be set on the basis of this result estimated by the facility influence determination process unit 16, it is desirable to set the past failure information on the basis of the actual failure occurrence location and the factor thereof or the external factor.

(Behavior)

Hereinafter, a behavior of the failure location identification apparatus 10 configured as described above is described.

Figure 7:
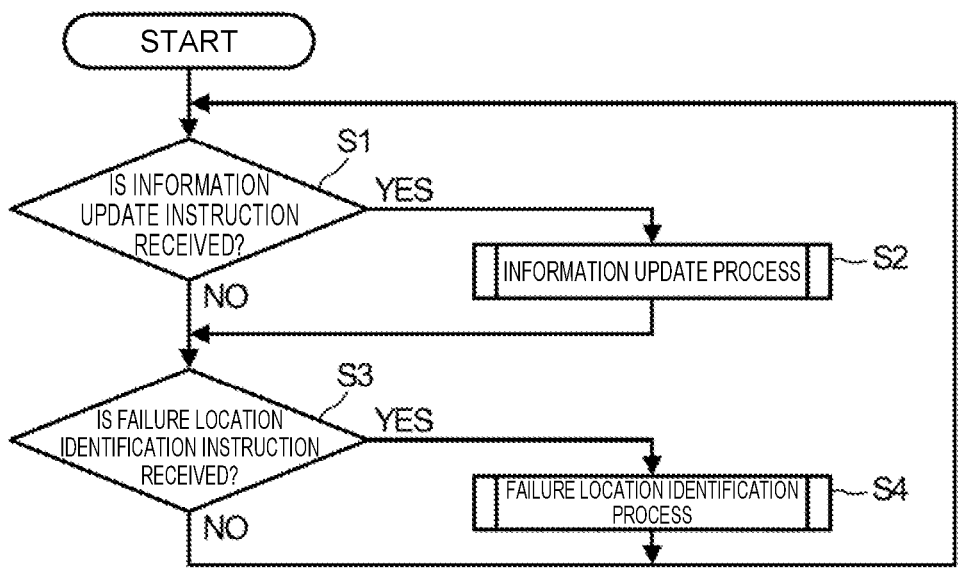
FIG. 7 is a diagram illustrating a flowchart for describing a behavior of the failure location identification apparatus.

FIG. 7 is a diagram illustrating a flowchart for describing the behavior of the failure location identification apparatus 10. A failure location identification program necessary to execute a control process illustrated in this flowchart is stored in the program memory 102 of the failure location identification apparatus 10, and the processor 101 reads out and executes the failure location identification program, whereby the processor 101 can behave as the respective functional units of the failure location identification apparatus 10. Note that, it is assumed that: an area serving as the facility failure information management unit 13 is prepared in the data memory 103; and the past failure information is accumulated in this area according to an arbitrary method.

First, the processor 101 determines whether or not an information update instruction is received (Step S1). For example, when the physical resource in the management area is changed, this information update instruction is input from the administrator terminal 400 to the failure location identification apparatus 10. The processor 101 can receive the information update instruction via the input-output interface 104. Alternatively, the information update instruction may be input from an external terminal that is not directly connected to the failure location identification apparatus 10, to the failure location identification apparatus 10 via the communication network NW, and the information update instruction thus input may be received by the processor 101 via the communication interface 105. Further, the information update instruction transmitted from the administrator terminal 400 or the external terminal may be regularly transmitted instead of operating, by the administrator or the like, in response to a change in the physical resource.

In the case where it is determined that the information update instruction is received (Yes in Step S1), the processor 101 implements an information update process to be described later in detail (Step S2).

In the case where it is determined that the information update instruction is not received (No in Step S1) or after the information update process in Step S2 is implemented, the processor 101 determines whether or not a failure location identification instruction is received (Step S3). For example, at the time of failure occurrence in the physical resource, this failure location identification instruction is input from the failure location identification instruction unit 40 to the failure location identification apparatus 10. The failure location identification instruction unit 40 is the administrator terminal 400 operated by the administrator. Moreover, the failure location identification instruction unit 40 may be input from an external terminal that is not directly connected to the failure location identification apparatus 10, to the failure location identification apparatus 10 via the communication network NW.

In the case where it is determined that the failure location identification instruction is received (Yes in Step S3), the processor 101 implements the failure location identification process to be described later in detail (Step S4).

In the case where it is determined that the failure location identification instruction is not received (No in Step S3) or after the failure location identification process in Step S4 is implemented, the processor 101 returns the processing behavior to Step S1.

Figure 8:
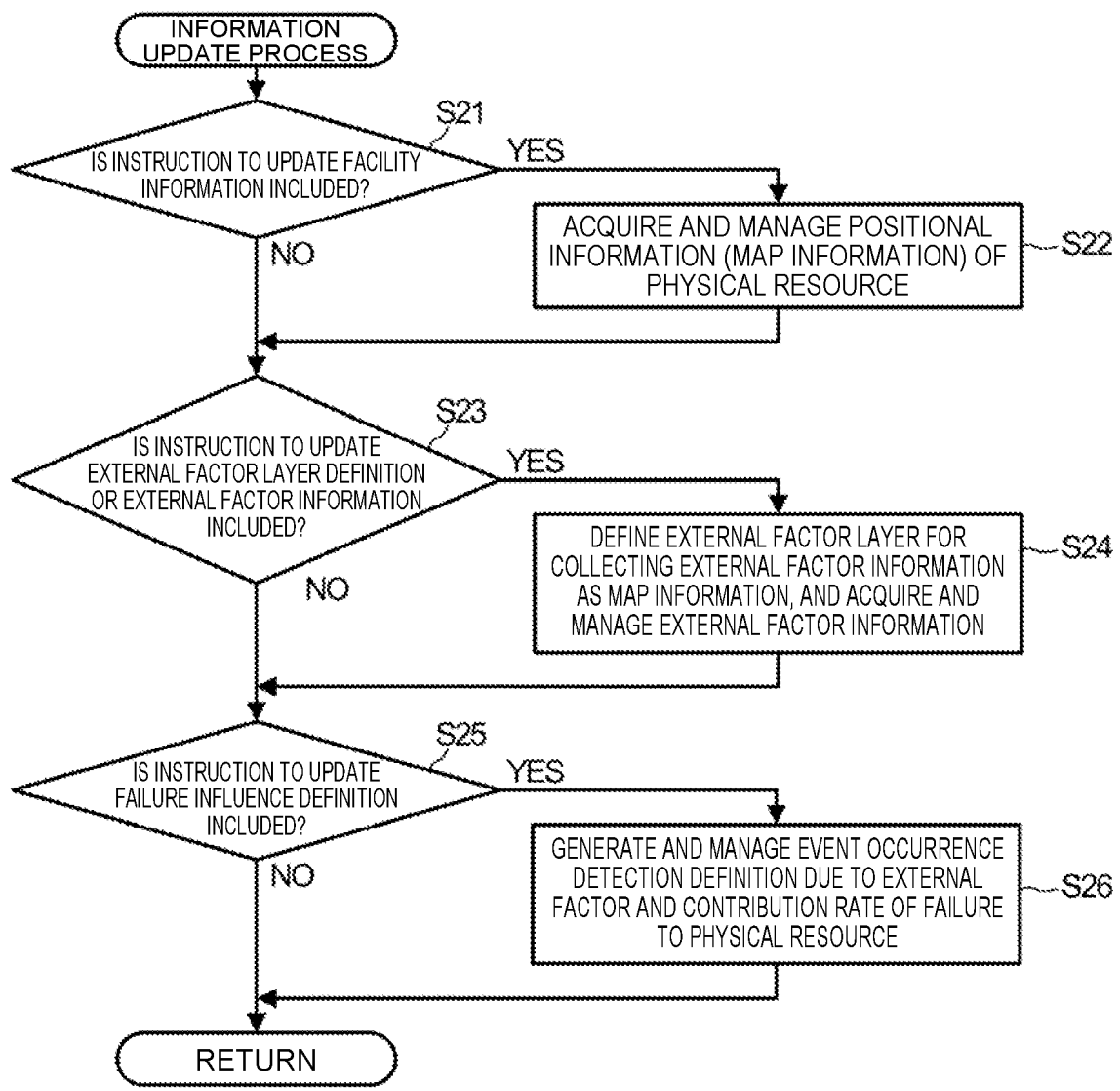
FIG. 8 is a diagram illustrating a flowchart for describing a detailed behavior of an information update process in FIG. 7.

FIG. 8 is a diagram illustrating a flowchart for describing a detailed behavior of the information update process in Step S2.

Figure 9:
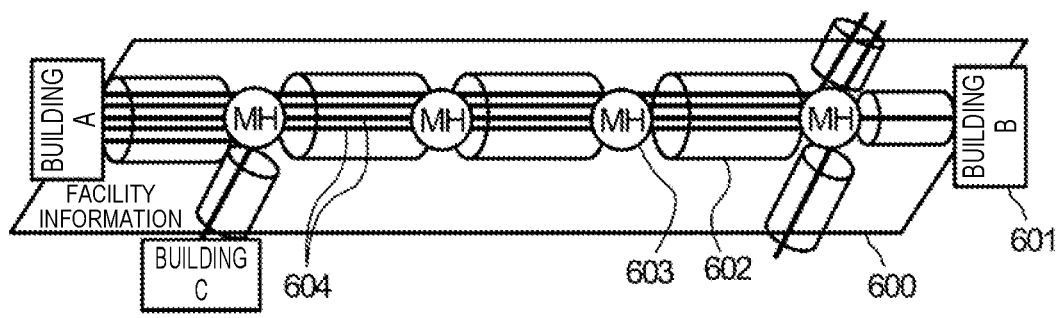
FIG. 9 is a schematic diagram for describing an acquisition behavior of facility information.

The processor 101 determines whether or not the received information update instruction includes an instruction to update the facility information (Step S21). In the case where the instruction to update the facility information is included (Yes in Step S21), the processor 101 first acquires and manages the positional information (map information) of the physical resource as the behavior of the facility information management unit 11 (Step S22). That is, the processor 101 acquires the positional information (map information) of the physical resource from the facility information database 20 of the database server 200 via the communication network NW by means of the communication interface 105, and saves and manages this item in the data memory 103. FIG. 9 is a schematic diagram for describing acquisition of the facility information, and FIG. 10 is a diagram illustrating an example of the facility information in the form of a table. As illustrated in FIG. 9, a storage area for storing the facility information 600 corresponding to the area managed by the failure location identification apparatus 10 is prepared in the data memory 103. The facility information 600 includes the positional information of the physical resources such as the buildings 601, the pipelines 602, the maintenance holes 603, and the cables 604. As illustrated in FIG. 10, the positional information can be stored as the positional coordinates, for example, the longitude and latitude, of each physical resource. For long objects such as the pipelines 602 and the cables 604, the positional information can include the positional coordinates of both ends of such objects.

Figure 11:
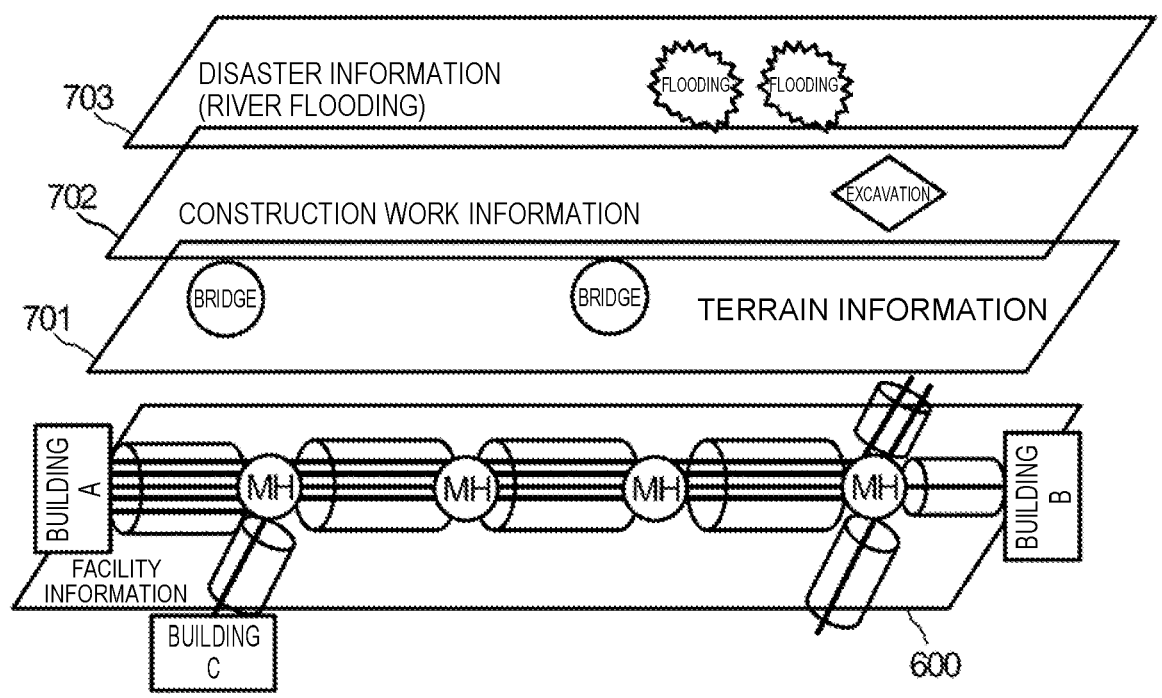
FIG. 11 is a schematic diagram for describing an external factor layer.

Next, in the case where the instruction to update the facility information is not included in Step S21 (No in Step S21), the processor 101 determines whether or not the received information update instruction includes an instruction to update an external factor layer definition or the external factor information (Step S23). In the case where the instruction to update the external factor layer definition or the external factor information is included (Yes in Step S23), the processor 101 defines the external factor layer for managing the external factor information on the same positional coordinates as those of the facility information, acquires the external factor information, and saves and manages these items in the data memory 103, as the behavior of the external factor information management unit 12 (Step S24). As described above, the external factor information also includes the positional information (map information) of the external factor. FIG. 11 is a schematic diagram for describing the external factor layer, and FIG. 12 is a diagram illustrating an example of the external factor layer in the form of a table. The processor 101 secures an area for storing a plurality of external factor layers corresponding to the facility information 600, in this example, three external factor layers 701, 702, 703, in the data memory 103. In this example, the external factor layer 701 is a layer for storing the terrain information, the external factor layer 702 is a layer for storing the construction work information, and the external factor layer 703 is another layer for storing river flooding as the disaster information. A storage area for storing each external factor layer is prepared in an area of the data memory 103 managed by the external factor information management unit 12. The external factor information management unit 12 stores the positional information of the acquired external factor information in the storage area of the corresponding external factor layer, to thereby manage this item.

Next, in the case where the instruction to update the external factor layer definition or the external factor information is not included in Step S23 (No in Step S23), the processor 101 determines whether or not the received information update instruction includes an instruction to update the failure influence definition (Step S25). In the case where the instruction to update the failure influence definition is included (Yes in Step S25), the processor 101 defines and manages the event occurrence detection definition due to the external factor and the contribution rate of the failure to the physical resource, as the behaviors of the failure influence definition generation unit 14 and the facility influence definition management unit 15 (Step S26). FIG. 13 is a diagram illustrating an example of the event occurrence detection definition and the contribution rate in the form of a table. On the basis of the failure information accumulated in the area serving as the facility failure information management unit 13 of the data memory 103, the processor 101 implements the above-mentioned behavior as the failure influence definition generation unit 14, generates the event occurrence detection definition and the contribution rate, and saves and manages these items in the data memory 103. In the example of FIG. 13, for example, for the event of "cable breaking due to river flooding," the event occurrence detection definition of "case where river flooding location and terrain information="bridge" coincide with each other" is generated, and the contribution rate thereof is calculated as "10." Moreover, for the event of "cable breaking due to excavation work," the event occurrence detection definition of "case where excavation exists in construction work information layer" is generated, and the contribution rate thereof is calculated as "5."

After that, in the case where the instruction to update the failure influence definition is not included in Step S25 (No in Step S25), the processor 101 ends this information update process, and the processing behavior proceeds to Step S3.

Figure 14:
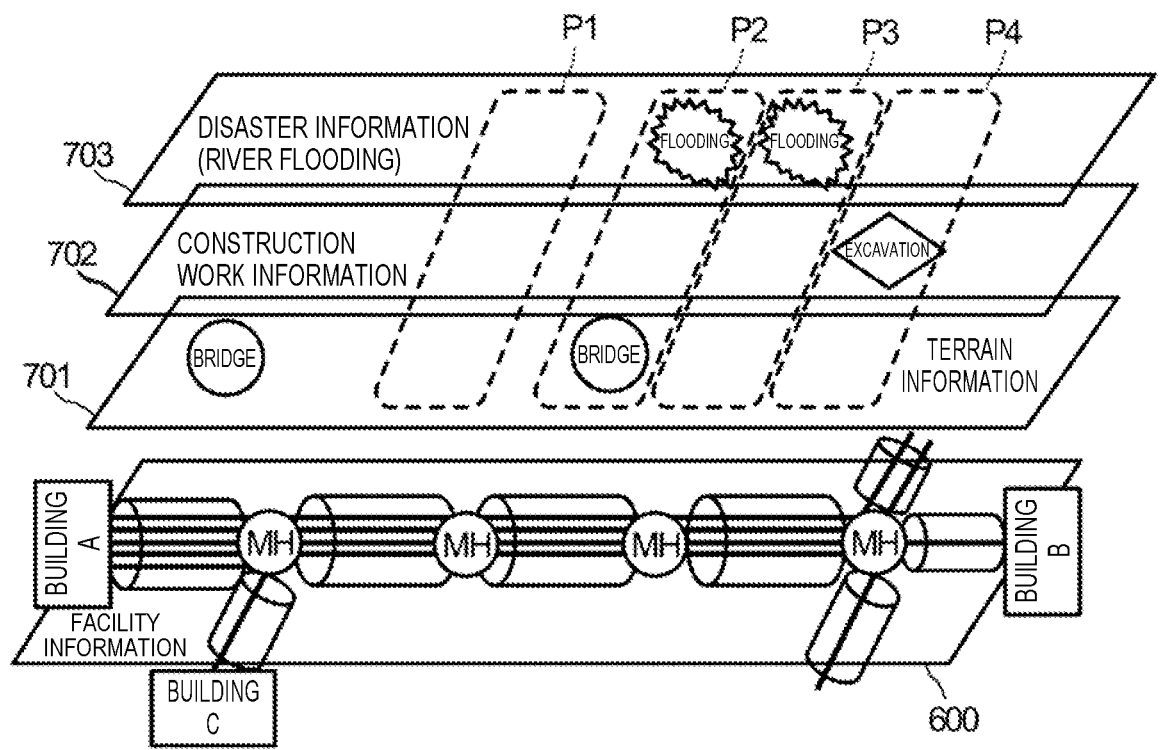
FIG. 14 is a schematic diagram illustrating an example of an occurrence situation of the external factor.

In the case of the example of the event occurrence detection definition and the contribution rate as in FIG. 13, event occurrence can be estimated as illustrated in FIG. 15 in the occurrence situation of each external factor as illustrated in FIG. 14. That is, at a position P1, because no external factor exists, the processor 101 can estimate that no event is occurring. At a position P2, because the terrain information="bridge" exists and river flooding exists at a position corresponding thereto, the processor 101 can estimate that the event of "cable breaking due to river flooding" is occurring at this position, and can define this position as the event occurrence location 800. Moreover, at a position P3, because river flooding exists but the terrain information="bridge" does not exist at a position corresponding thereto, the processor 101 can estimate that no event is occurring. Then, at a position P4, because excavation exists in a construction work information layer, the processor 101 can estimate that the event of "cable breaking due to excavation work" is occurring at this position, and can define this position as the event occurrence location 800.

Figure 16:
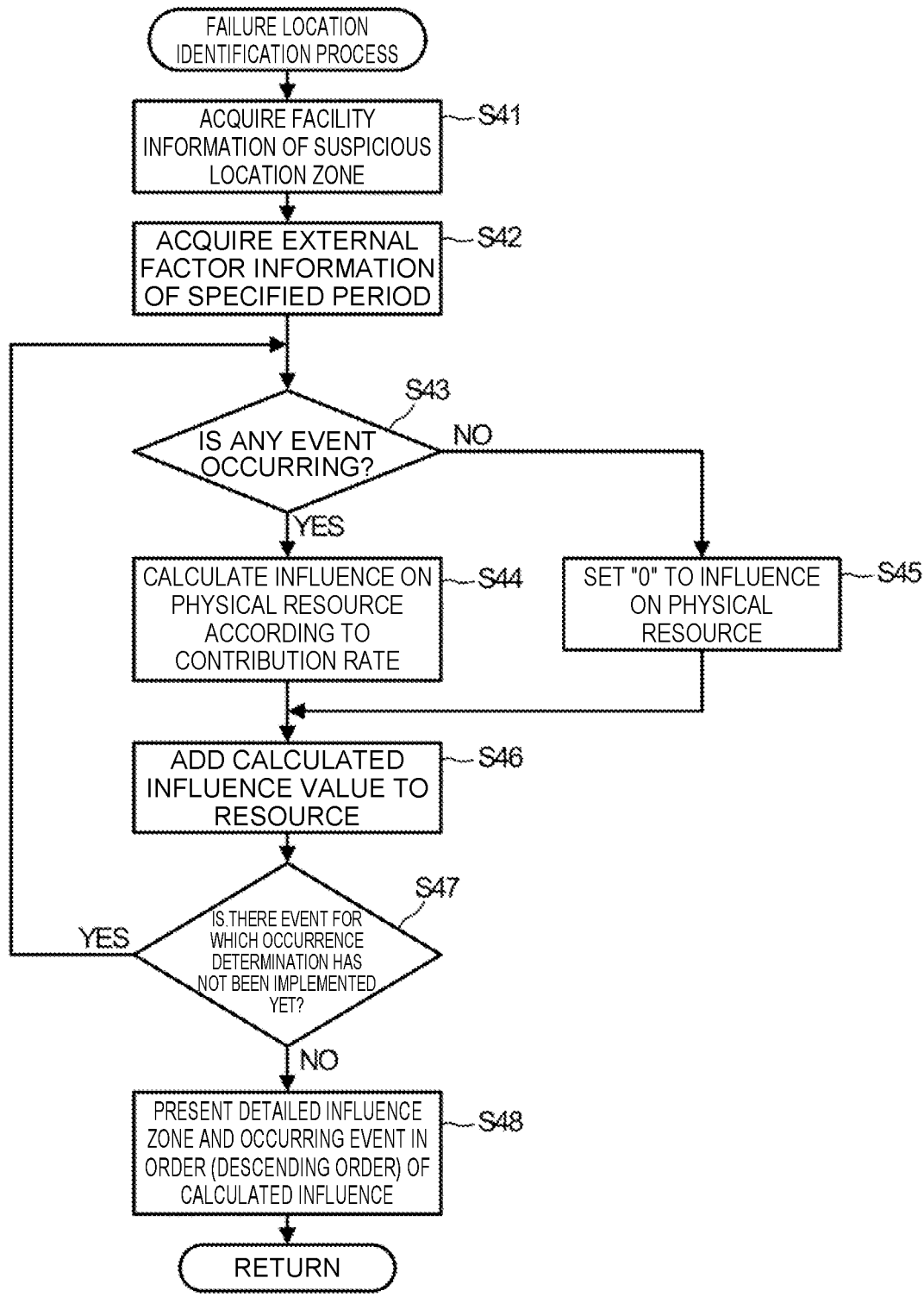
FIG. 16 is a diagram illustrating a flowchart for describing a detailed behavior of a failure location identification process in FIG. 7.

Hereinafter, a detailed behavior of the failure location identification process in Step S4 in which such estimation as described above is performed is described with reference to a flowchart of FIG. 16.

Figure 17:
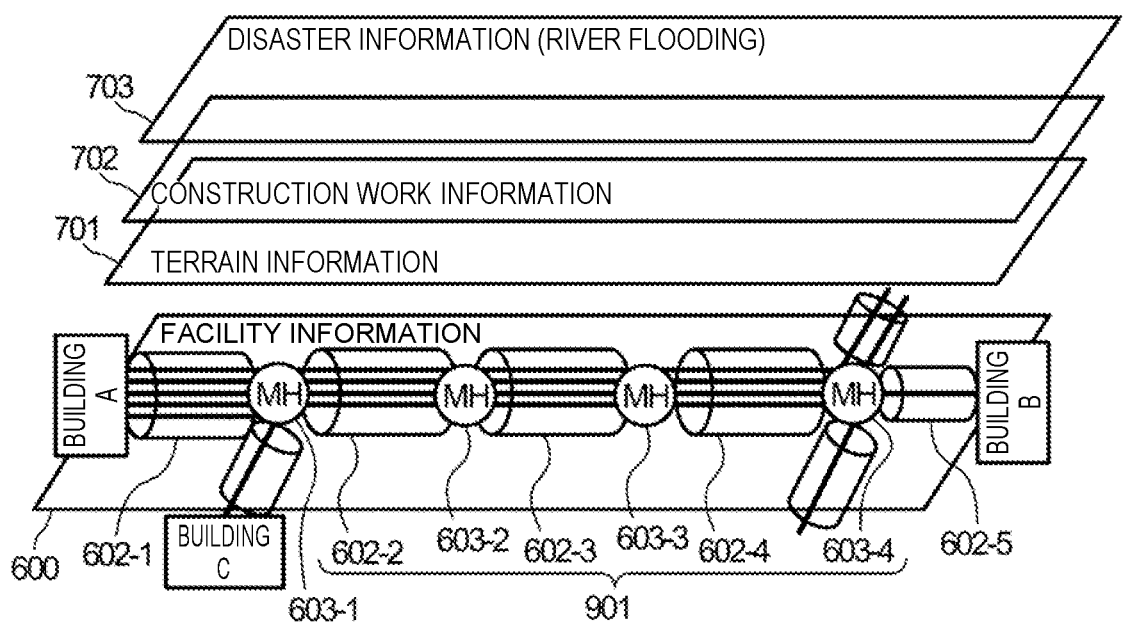
FIG. 17 is a schematic diagram for describing a suspicious location zone.

First, the processor 101 implements the behavior as the facility information management unit 11, that is, acquires the facility information of a suspicious location zone, and transfers the acquired item to the facility influence determination process unit 16 (Step S41). FIG. 17 is a schematic diagram for describing a suspicious location zone 901. For example, the failure location identification instruction that is input from the failure location identification instruction unit 40 at the time of failure occurrence in the physical resource can include information for identifying the suspicious location zone 901. A zone that is determined by the administrator that a failure is suspected to occur may be specified as the suspicious location zone 901, and a failure occurrence suspicious zone estimated according to, for example, the method proposed in Non-Patent Literature 1 may be specified as the suspicious location zone 901. The processor 101 stores the acquired information for identifying the suspicious location zone 901, in the data memory 103. In the example of FIG. 17, instructed is a zone of the pipelines 602-2 to 602-4 and the maintenance holes 603-2 to 603-4, of a set of the pipelines 602-1 to 602-5 and the maintenance holes 603-1 to 603-4 through which cables pass between the building A and the building B. The processor 101 determines the facility information specified by the suspicious location zone 901, of the facility information stored in the data memory 103, as the processing range of the failure location identification. Note that, the entire area managed by the failure location identification apparatus 10 may be specified as the suspicious location zone 901.

Figure 18:
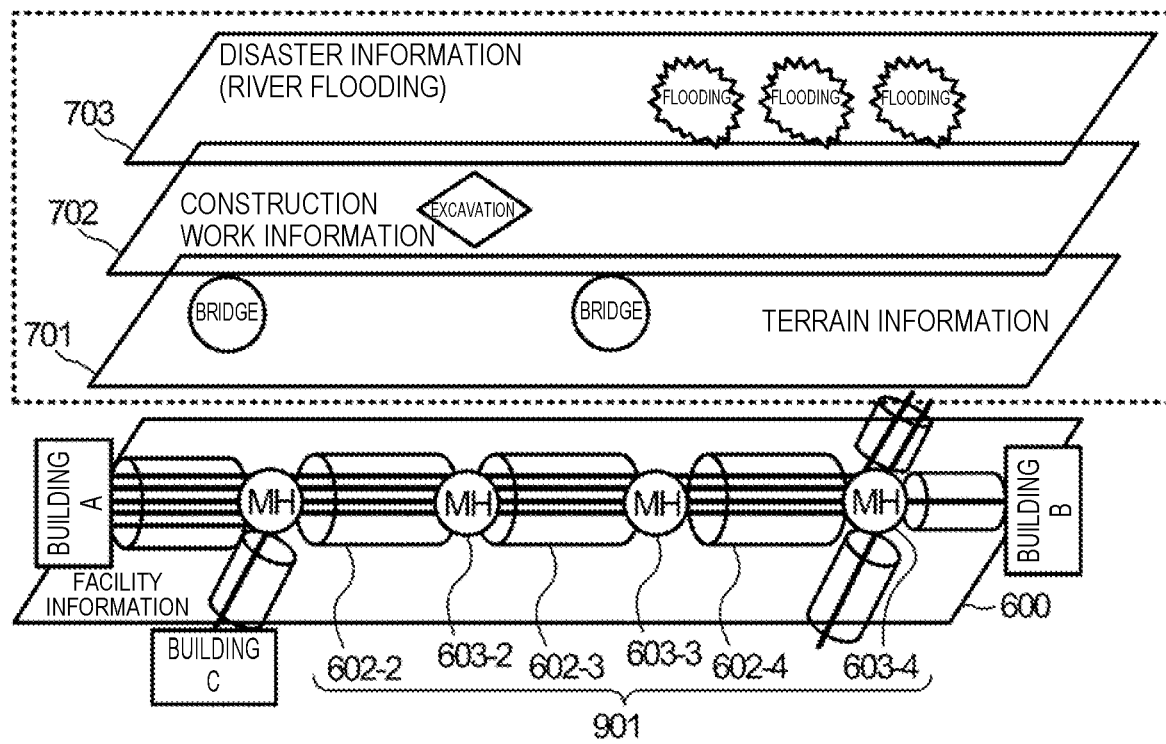
FIG. 18 is a schematic diagram for describing external factor information of a specified period.

Next, the processor 101 implements the behavior as the external factor information management unit 12, that is, acquires the external factor information of a specified period, and transfers the acquired item to the facility influence determination process unit 16 (Step S42). FIG. 18 is a schematic diagram for describing the external factor information of the specified period. The specified period can be included in the failure location identification instruction input from the failure location identification instruction unit 40. The specified period may be a present time point, and may include an arbitrary period before the present time point. Moreover, the specified period may be an arbitrary past period not including the present time point. The processor 101 acquires the external factor information of the specified period from the external information database 30 of the database server 200 via the communication network NW by means of the communication interface 105, and saves the acquired item in the data memory 103. At the time of saving the acquired item, the processor 101 arranges each piece of the acquired external factor information on its corresponding external factor layer defined and managed in Step S24, as illustrated in FIG. 18. Specifically, in the data memory 103, a storage area corresponding to each physical resource of the facility information 600 is secured for each external factor layer, and a flag or a value indicating external factor existence and information for identifying the external factor (such as the name of the external factor) are stored in this storage area on the basis of the positional information of the acquired external factor information. As a matter of course, the storing mode is not limited thereto, and any mode may be adopted as long as the physical resource and the external factor information that possibly causes the failure in the physical resource can be recorded and managed in association with each other on the same positional coordinates. There is a possibility that the external factor information changes from the acquisition time point in Step S24, and hence the external factor information is updated to the latest information in Step S42. The example of FIG. 18 is compared with the example of FIG. 11 as follows: one piece of excavation work is ended at one location to be thereby deleted; new excavation work is started at another location, whereby the positional information of the new excavation work is arranged; and river flooding newly occurs at one location, whereby the positional information of the flooding is arranged.

Then, the processor 101 implements the following behavior as the facility influence determination process unit 16.

Figure 19:
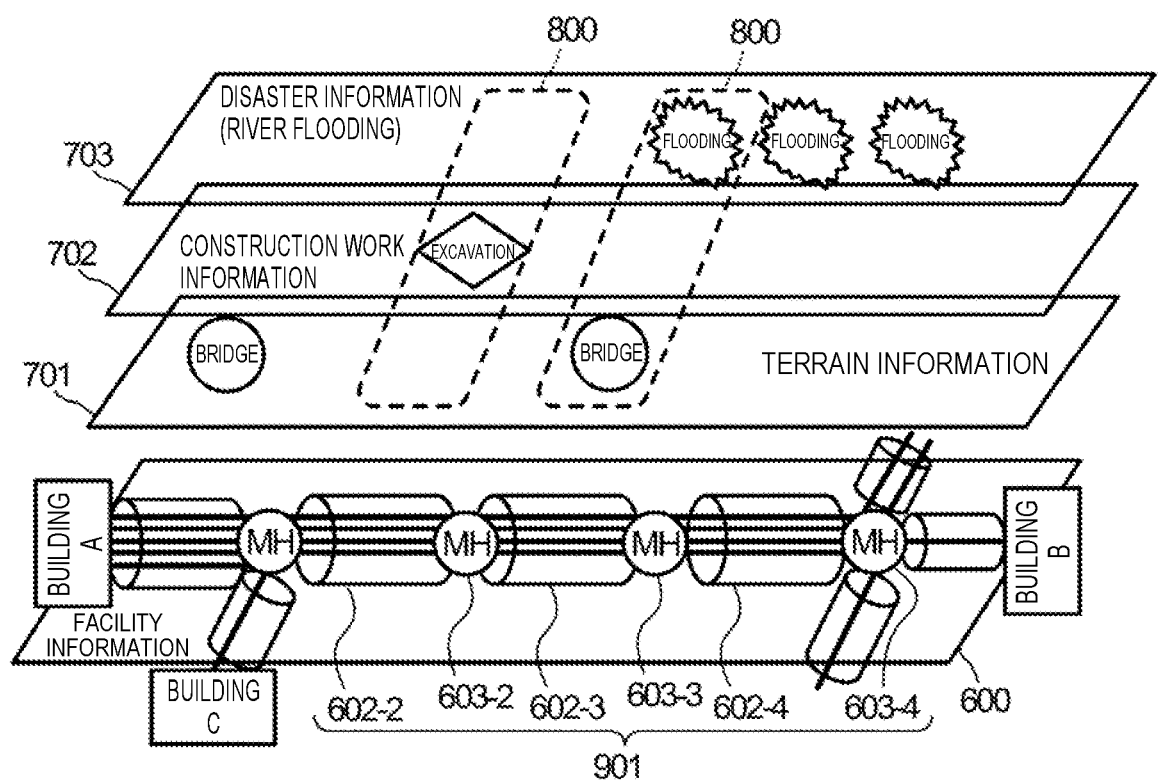
FIG. 19 is a schematic diagram for describing an event occurrence/non-occurrence determination behavior that is performed with reference to the event occurrence detection definition and is based on the external factor information and the suspicious location zone.

That is, the processor 101 determines whether or not any event is occurring (Step S43). FIG. 19 is a schematic diagram for describing this event occurrence/non-occurrence determination behavior. The processor 101 refers to the event occurrence detection definition that is generated in Step S26 and is stored in the data memory 103, and determines the event occurrence/non-occurrence on the basis of: the external factor information that is acquired in Step S42 and is stored in the data memory 103; and the suspicious location zone that is acquired in Step S41 and is stored in the data memory 103. In this case, the processor 101 determines whether or not the external factor information at the position corresponding to each physical resource in the suspicious location zone corresponds to, for example, coincides with the event occurrence detection definition, and thus can determine the event occurrence/non-occurrence. For example, in the case where the event occurrence detection definition is as in the example illustrated in FIG. 13, for the position corresponding to the pipeline 602-2, the excavation work exists in the construction work information of the external factor layer 702, and hence the processor 101 determines the event occurrence at this position according to the event occurrence detection definition of "case where excavation exists in construction work information layer," and determines this position as the event occurrence location 800. Moreover, for the position corresponding to the pipeline 602-2, the bridge exists in the terrain information of the external factor layer 701, the river flooding exists in the disaster information (river flooding) of the external factor layer 703, and hence the processor 101 determines the event occurrence at this position according to the event occurrence detection definition of "case where river flooding location and terrain information="bridge" coincide with each other," and determines this position as the event occurrence location 800. For the positions corresponding to the maintenance hole 603-3 and the pipeline 602-4, the river flooding exists in the disaster information (river flooding) of the external factor layer 703, but no external factor exists in the other external factor layers, and hence the processor 101 determines the event non-occurrence at these positions according to the event occurrence detection definition. Moreover, for the positions corresponding to the maintenance holes 603-2 and 603-4, no external factor exists in any of the external factor layers, and hence the processor 101 determines the event non-occurrence at these positions according to the event occurrence detection definition.

Figure 20:
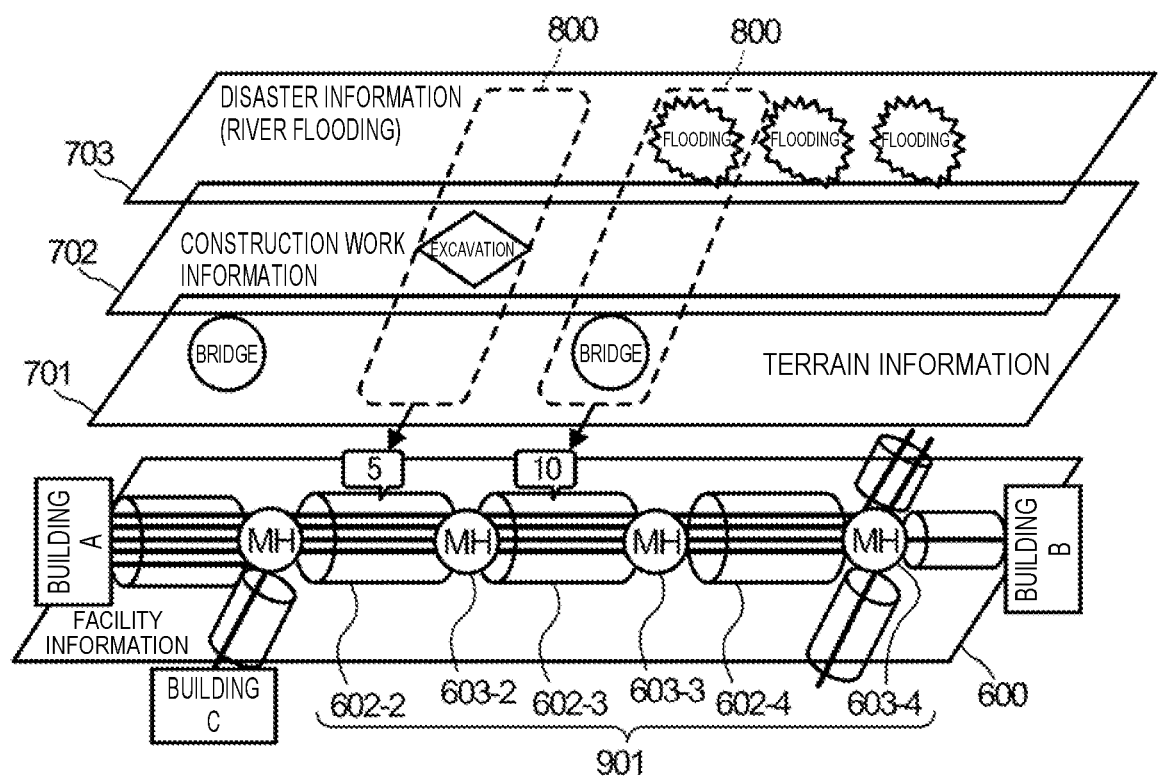
FIG. 20 is a schematic diagram for describing a calculation behavior of an influence on the physical resource according to the contribution rate.

In the case where the event occurrence is determined (Yes in Step S43), the processor 101 calculates the influence on the physical resource according to the contribution rate (Step S44). FIG. 20 is a schematic diagram for describing this calculation behavior of the influence on the physical resource according to the contribution rate. The processor 101 refers to the contribution rate that is generated in Step S26 and is stored in the data memory 103, and calculates the degree of the influence of the occurring event on the physical resource. For example, for the event occurrence location 800 at the position at which the excavation work exists in the construction work information of the external factor layer 702, the contribution rate to this event occurrence detection definition is "5" as illustrated in FIG. 13, and hence the value of "5" is calculated as the influence on the physical resource. Moreover, for the event occurrence location 800 at the position at which the bridge exists in the terrain information of the external factor layer 701 and the river flooding exists in the disaster information (river flooding) of the external factor layer 703, "10" is calculated as the influence on the physical resource in a similar manner.

On the other hand, in the case where the event non-occurrence is determined (No in Step S43), the processor 101 sets "0" to the influence on the physical resource (Step S45).

After the influence on the physical resource is calculated in this way, the processor 101 adds the calculated influence value to the resource (Step S46). That is, a plurality of events can occur at the position of one physical resource, and the influence values of the plurality of occurring events are added in such a case. Accordingly, the addition result of the influence values can be utilized as a value representing the possibility of the failure occurrence due to at least one event occurrence in the physical resource.

After that, the processor 101 determines whether or not there is an event for which the event occurrence determination has not been implemented yet (Step S47). As described above, a plurality of events can occur in one physical resource in some cases. The external factor that is not utilized according to one event occurrence detection definition but is utilized according to another event occurrence detection definition may exist at the position corresponding to the physical resource in some cases. Moreover, the external factor utilized according to one event occurrence detection definition may be utilized according to another event occurrence detection definition in some cases. In view of this, for the combinations of all the external factors at the position corresponding to each physical resource, the processor 101 determines whether or not the event occurrence determination has been implemented according to all the event occurrence detection definitions. In the case where it is determined that there is an event for which the event occurrence determination has not been implemented yet (Yes in Step S47), the processor 101 returns the processing behavior to Step S43.

Figure 21:
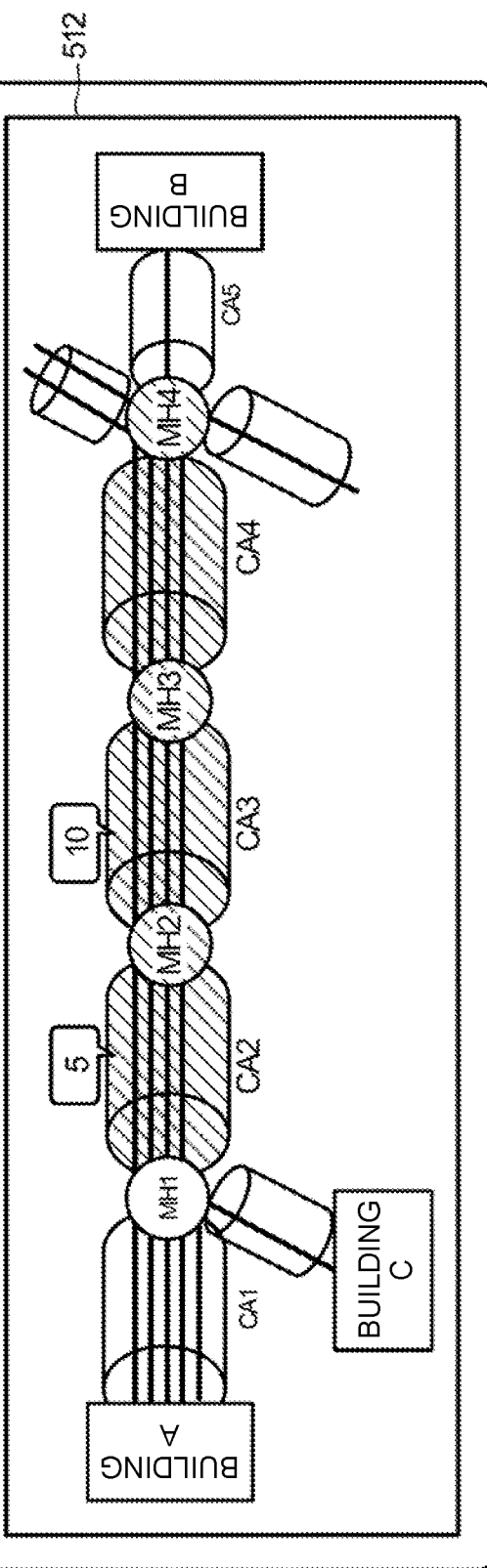
FIG. 21 is a diagram illustrating a presentation example of an influence zone and an occurring event.

On the other hand, in the case where it is determined that there is no event for which the event occurrence determination has not been implemented yet (No in Step S47), the processor 101 presents the detailed influence zone and the occurring event to the user terminal 500 as the failure location presentation unit 50, in the order (descending order) of the influence values calculated in Step S46 (Step S48). FIG. 21 is a diagram illustrating a presentation example of the influence zone and the occurring event. For example, two display windows 511, 512 are displayed on a display unit 501 of the user terminal 500, and each influence zone and each occurring event are displayed in letters in the influence order on the display window 511, one of the two display windows. At this time, the positional information (map information) of the physical resource is displayed as images on the display window 512, the other of the two display windows, whereby the user can easily understand the position of the physical resource in which there is a high possibility that a failure is occurring. As a matter of course, such information presentation as images is not indispensable. The processor 101 transmits failure location information for performing such display to the user terminal 500 via the communication network NW by means of the communication interface 105. This failure location information may be transmitted as image information that only needs to be displayed on the display unit 501, and may be transmitted as data that enables creation of display data through processing in the user terminal 500. Moreover, instead of directly transmitting the failure location information to the user terminal 500, the processor 101 may transmit the failure location information to the administrator terminal 400 via the input-output interface 104, and then the failure location information may be transmitted from the administrator terminal 400 to the user terminal 500. This can eliminate the need to hold information that is necessary for the failure location identification apparatus 10 to communicate with the user terminal 500, such as address information and authentication information, and thus can suppress a memory resource for saving such information.

Note that, in the example of FIG. 21, even if the influence value calculated in Step S46 is "0," because the possibility that a failure is occurring is not zero, "unknown" is presented as the occurring event in the corresponding zone. However, for such a zone in which the influence value is "0," the possibility that a failure is occurring may be regarded as being low, and the presentation thereof may be omitted. Alternatively, an appropriate threshold may be set to the influence value. In this case, if the influence value is lower than the set threshold, the possibility that a failure is occurring may be regarded as being low, and the presentation thereof may be omitted.

After that, the processor 101 ends this failure location identification process, and returns the processing behavior to Step S1.

As described hereinabove, in the failure location identification apparatus 10 according to one embodiment of the present invention, the facility information management unit 11 records therein facility information including positional information of a physical resource, the external factor information management unit 12 records therein external factor information concerning an external factor that possibly becomes a factor that causes a failure in the physical resource, the external factor information including positional information of the external factor, the facility influence definition management unit 15 records therein information concerning a possible influence of the external factor on the physical resource, and the facility influence determination process unit 16 identifies a failure occurrence location at which the failure is estimated to occur in the physical resource, from the facility information that is recorded in the facility information management unit 11 and has positional information corresponding to the positional information of the external factor information, and outputs failure location information including information indicating the identified failure occurrence location, when it is determined that the external factor information recorded in the external factor information management unit 12 influences the physical resource, on the basis of the information recorded in the facility influence definition management unit 15. In this way, the failure occurrence location at which the failure is estimated to occur in the resource is identified on the basis of the information concerning the possible influence of the external factor on the physical resource, whereby the identification accuracy of a detailed place of the failure occurrence location can be improved at the time of the failure occurrence.

Moreover, in the failure location identification apparatus 10 according to one embodiment, the facility influence determination process unit 16 further identifies an occurrence factor of the failure, and adds information indicating an event that is the occurrence factor, to the failure location information. This enables the user to know not only the failure occurrence location but also the occurrence factor.

Moreover, in the failure location identification apparatus 10 according to one embodiment, the facility influence definition management unit 15 records therein: an event occurrence detection definition that is an occurrence detection definition indicating in which combination of the external factors the occurrence factor occurs; and a contribution rate indicating a possibility at which the combination of the external factors influences the physical resource, and the facility influence determination process unit 16 identifies the failure occurrence location on the basis of the occurrence detection definition recorded in the facility influence definition management unit 15, calculates a failure occurrence possibility at the identified failure occurrence location on the basis of the contribution rate recorded in the facility influence definition management unit 15, and adds information indicating the calculated failure occurrence possibility to the failure location information. In this way, the failure occurrence location can be identified on the basis of the occurrence detection definition, and the failure occurrence possibility at the identified failure occurrence location can be calculated on the basis of the contribution rate.

Moreover, in the failure location identification apparatus 10 according to one embodiment, the facility influence determination process unit 16 limits the facility information and the external factor information used for identifying the failure occurrence location, in accordance with: a suspicious location zone in which the failure is suspected to occur in the physical resource; and a specified period in which the influence of the external factor is to be determined. This can avoid the waste that unnecessary facility information and unnecessary external factor information become processing targets, and can shorten the time to obtain a failure location identification result.

Moreover, in the failure location identification apparatus 10 according to one embodiment, when a given combination of the external factors that exist in the specified period at a position corresponding to the suspicious location zone corresponds to (for example, coincides with) the combination indicated by the occurrence detection definition recorded in the facility influence definition management unit 15, the facility influence determination process unit 16 identifies, as the failure occurrence location, the physical resource existing at a position at which the given combination exists, and identifies, as the occurrence factor of the failure, the occurrence factor in the occurrence detection definition indicating the corresponding combination. In this way, the failure occurrence location and the occurrence factor can be identified on the basis of the combination of the external factors that exist in the specified period at the position corresponding to the suspicious location zone.

Moreover, in the failure location identification apparatus 10 according to one embodiment, the failure influence definition generation unit 14 generates the occurrence detection definition on the basis of: an occurrence factor of a failure that has occurred in a past; an occurrence location of the failure; and external factor information at the time of occurrence of the failure, generates the contribution rate on the basis of: a number of items in which the failure does not occur while the items correspond to the occurrence factor that is the basis for the generated occurrence detection definition; and a number of items in which the failure actually occurs correspondingly to the occurrence factor, and records the generated occurrence detection definition and the generated contribution rate in the facility influence definition management unit 15. In this way, the contribution rate can be easily generated on the basis of the failure that has occurred in the past.

Note that, the method described in one embodiment can also be distributed as a program (software means) executable by a computer by: storing the program in a recording medium, for example, a magnetic disk (such as a floppy (registered trademark) disk and a hard disk), an optical disk (such as a CD-ROM, a DVD, and an MO), and a semiconductor memory (such as a ROM, a RAM, and a flash memory); and transmitting the stored program via a communication medium. Note that, the program stored in such a medium includes a setting program for configuring, in the computer, software means (including not only an execution program but also a table and a data structure) to be executed by the computer. The computer that realizes the present apparatus executes the above-mentioned processing by: reading the program stored in the recording medium; establishing the software means according to the setting program as needed; and controlling the behavior by this software means. Note that, the recording medium described herein is not limited to a medium for distribution, but includes storage media such as a magnetic disk and a semiconductor memory that are provided inside of the computer or a machine connected via the network.

Note that, the present invention is not limited to the above-mentioned embodiments, but can be variously modified within the range not departing from the scope thereof, in an implementation phase. Moreover, the respective embodiments may be implemented in combination as appropriate, and a combined effect can be obtained in this case. Further, the above-mentioned embodiments include various inventions, and various inventions can be extracted on the basis of combinations selected from the plurality of disclosed constituent elements. For example, in the case where a problem can be solved and where an effect can be obtained even if some constituent elements are deleted from all the constituent elements described in the embodiments, a configuration in which these constituent elements are deleted can be extracted as an invention.

REFERENCE SIGNS LIST

1 Failure location identification system
10 Failure location identification apparatus
11 Facility information management unit
12 External factor information management unit
13 Facility failure information management unit
14 Failure influence definition generation unit
15 Facility influence definition management unit
16 Facility influence determination process unit
20 Facility information database
30 External information database
40 Failure location identification instruction unit
50 Failure location presentation unit
101 Processor
102 Program memory
103 Data memory
104 Input-output interface
105 Communication interface
106 Bus
200 Database server
400 Administrator terminal
500 User terminal
501 Display unit
511, 512 Display windows
600 Facility information
601 Building
602, 602-1 to 602-5 Pipelines
603, 603-1 to 603-4 Maintenance holes
604 Cable
701, 702, 703, 704, 705 External factor layers
800 Event occurrence location
901 Suspicious location zone
NW Communication network

The invention claimed is:

1. A failure location identification apparatus that identifies a failure occurrence location of a physical resource, comprising:
a processor; and
a storage medium having computer program instructions stored thereon, when executed by the processor, perform to:
records therein facility information including positional information of the physical resource;
records therein external factor information concerning an external factor that possibly becomes a factor that causes a failure in the physical resource, the external factor information including positional information of the external factor;
records therein influence information concerning a possible influence of the external factor on the physical resource; and
identifies the failure occurrence location at which the failure is estimated to occur in the physical resource, from the facility information and has positional information corresponding to the positional information of the external factor information, and outputs failure location information including information indicating the identified failure occurrence location, when it is determined that the external factor information influences the physical resource, on a basis of the influence information.

2. The failure location identification apparatus according to claim 1, wherein the computer program instructions further perform to identifies an occurrence factor of the failure, and adds information indicating the occurrence factor to the failure location information.

3. The failure location identification apparatus according to claim 2, wherein the computer program instructions further perform to
records therein, as the information: an occurrence detection definition indicating in which combination of the external factors the occurrence factor occurs; and a contribution rate indicating a possibility at which the combination of the external factors influences the physical resource, and
the facility influence determination process unit identifies the failure occurrence location on a basis of the occurrence detection definition recorded in the facility influence definition management unit, calculates a failure occurrence possibility at the identified failure occurrence location on a basis of the contribution rate recorded in the facility influence definition management unit, and adds information indicating the calculated failure occurrence possibility to the failure location information.

4. The failure location identification apparatus according to claim 3, wherein the computer program instructions further perform to limits the facility information and the external factor information used for identifying the failure occurrence location, in accordance with: a suspicious location zone in which the failure is suspected to occur in the physical resource; and a specified period in which the influence of the external factor is to be determined.

5. The failure location identification apparatus according to claim 4, wherein the computer program instructions further perform to, when a given combination of the external factors that exist in the specified period at a position corresponding to the suspicious location zone corresponds to the combination indicated by the occurrence detection definition, identifies, as the failure occurrence location, the physical resource existing at a position at which the given combination exists, and identifies, as the occurrence factor of the failure, the occurrence factor in the occurrence detection definition indicating the corresponding combination.

6. The failure location identification apparatus according to claim 3 wherein the computer program instructions further perform to generates the occurrence detection definition on a basis of: an occurrence factor of a failure that has occurred in a past; an occurrence location of the failure; and external factor information at a time of occurrence of the failure, generates the contribution rate on a basis of: a number of items in which the failure does not occur while the items correspond to the occurrence factor that is the basis for the generated occurrence detection definition; and a number of items in which the failure actually occurs correspondingly to the occurrence factor, and records the generated occurrence detection definition and the generated contribution rate in the facility influence definition management unit.

7. A failure location identification method performed by a failure location identification apparatus that identifies a failure occurrence location of a physical resource, the method comprising:

recording facility information including positional information of the physical resource;

recording external factor information concerning an external factor that possibly becomes a factor that causes a failure in the physical resource, the external factor information including positional information of the external factor;

recording information concerning a possible influence of the external factor on the physical resource; and identifying the failure occurrence location at which the failure is estimated to occur in the physical resource, from the facility information having positional information corresponding to the positional information of the external factor information, and outputting failure location information including information indicating the identified failure occurrence location, when it is determined that the external factor information influences the physical resource, on a basis of the information concerning the possible influence of the external factor on the physical resource.

8. The failure location identification method according to claim 7 further comprises identifying an occurrence factor of the failure, and adding information indicating the occurrence factor to the failure location information.

9. The failure location identification method according to claim 8 further comprises recording as the information an occurrence detection definition indicating in which combination of the external factors the occurrence factor occurs; and a contribution rate indicating a possibility at which the combination of the external factors influences the physical resource, and identifying the failure occurrence location on a basis of the occurrence detection definition, calculating a failure occurrence possibility at the identified failure occurrence location on a basis of the contribution rate, and adding information indicating the calculated failure occurrence possibility to the failure location information.

10. The failure location identification method according to claim 9 further comprises limiting the facility information and the external factor information used for identifying the failure occurrence location, in accordance with: a suspicious location zone in which the failure is suspected to occur in the physical resource; and a specified period in which the influence of the external factor is to be determined.

11. The failure location identification method according to claim 10 further comprises, when a given combination of the external factors that exist in the specified period at a position corresponding to the suspicious location zone corresponds to the combination indicated by the occurrence detection definition, identifying, as the failure occurrence location, the physical resource existing at a position at which the given combination exists, and identifying, as the occurrence factor of the failure, the occurrence factor in the occurrence detection definition indicating the corresponding combination.

12. The failure location identification method according to claim 9 further comprises generating the occurrence detection definition on a basis of: an occurrence factor of a failure that has occurred in a past; an occurrence location of the failure; and external factor information at a time of occurrence of the failure, generating the contribution rate on a basis of: a number of items in which the failure does not occur while the items correspond to the occurrence factor that is the basis for the generated occurrence detection definition; and a number of items in which the failure actually occurs correspondingly to the occurrence factor, and recording the generated occurrence detection definition and the generated contribution rate.

13. A non-transitory computer-readable medium having computer-executable instructions that, upon execution of the instructions by a processor of a computer, cause the computer to function as:

a facility information management unit that records therein facility information including positional information of the physical resource;

an external factor information management unit that records therein external factor information concerning an external factor that possibly becomes a factor that causes a failure in the physical resource, the external factor information including positional information of the external factor;

a facility influence definition management unit that records therein information concerning a possible influence of the external factor on the physical resource; and a facility influence determination process unit that identifies the failure occurrence location at which the failure is estimated to occur in the physical resource, from the facility information that is recorded in the facility information management unit and has positional information corresponding to the positional information of the external factor information, and outputs failure location information including information indicating the identified failure occurrence location, when it is determined that the external factor information recorded in the external factor information management unit influences the physical resource, on a basis of the information recorded in the facility influence definition management unit.

* * * * *